United States Patent
Cho et al.

(10) Patent No.: US 12,521,694 B2
(45) Date of Patent: Jan. 13, 2026

(54) POROUS MEMBRANE INCLUDING PERFLUOROALKOXY ALKANE (PFA)-BASED MELT-EXTRUDED FILM AND HAVING PORES CONTROLLED BY BIAXIAL STRETCHING, AND MANUFACTURING METHOD THEREFOR

(71) Applicant: PUKYONG NATIONAL UNIVERSITY INDUSTRY-UNIVERSITY COOPERATION FOUNDATION, Busan (KR)

(72) Inventors: Kie Yong Cho, Busan (KR); Min Young Son, Busan (KR); Young Je Kwon, Busan (KR); Gyeong Min Choi, Busan (KR); Jae Won Park, Busan (KR)

(73) Assignee: PUKYONG NATIONAL UNIVERSITY INDUSTRY-UNIVERSITY COOPERATION FOUNDATION, Busan (KR)

(*) Notice: Subject to any disclaimer, the term of this patent is extended or adjusted under 35 U.S.C. 154(b) by 378 days.

(21) Appl. No.: 18/195,722

(22) Filed: May 10, 2023

(65) Prior Publication Data
US 2023/0381742 A1    Nov. 30, 2023

(30) Foreign Application Priority Data
May 27, 2022    (KR) .................... 10-2022-0065037

(51) Int. Cl.
*B01J 20/26*    (2006.01)
*B01D 67/00*    (2006.01)
(Continued)

(52) U.S. Cl.
CPC .......... *B01J 20/261* (2013.01); *B01D 67/002* (2013.01); *B01D 67/0027* (2013.01);
(Continued)

(58) Field of Classification Search
None
See application file for complete search history.

(56) References Cited

U.S. PATENT DOCUMENTS

2015/0079392 A1* 3/2015 Hayashi ............... C08J 9/24
                                                    210/500.36
2020/0298184 A1* 9/2020 Seo ................. B01D 67/0027

FOREIGN PATENT DOCUMENTS

KR    10-0308525 B1    11/2001
KR    10-0928898 B1    11/2009
(Continued)

OTHER PUBLICATIONS

Korean Office Action for related KR Application No. 10-2022-0065037 mailed Mar. 25, 2024 from Korean Intellectual Property Office.
(Continued)

*Primary Examiner* — Krishnan S Menon
(74) *Attorney, Agent, or Firm* — Paratus Law Group, PLLC

(57) ABSTRACT

There are provided a porous membrane including a perfluoroalkoxy alkane (PFA)-based melt-extruded film and having pores controlled by biaxial stretching, and a manufacturing method therefore. The porous membrane is for water treatment and includes a fluoropolymer. The method includes forming a film by melt-extruding a fluoropolymer; and controlling the pore size of the formed film by biaxial stretching. The membrane for water treatment is based on a fluoropolymer and has physical properties that are resistant to high temperatures and strong acids, and it is able to be
(Continued)

used for treatment of wastewater such as semiconductor wastewater.

4 Claims, 17 Drawing Sheets

(51) Int. Cl.
    *B01D 71/36*     (2006.01)
    *B01D 71/38*     (2006.01)
    *B01J 20/28*     (2006.01)
    *B01J 20/30*     (2006.01)
    *C02F 1/44*     (2023.01)
    *C02F 103/34*     (2006.01)
    *C08F 214/26*     (2006.01)
    *C08J 5/18*     (2006.01)

(52) U.S. Cl.
    CPC ............ *B01D 71/36* (2013.01); *B01D 71/382* (2022.08); *B01J 20/28004* (2013.01); *B01J 20/28033* (2013.01); *B01J 20/28083* (2013.01); *B01J 20/28085* (2013.01); *B01J 20/3007* (2013.01); *C02F 1/44* (2013.01); *C08F 214/262* (2013.01); *C08J 5/18* (2013.01); *B01D 2323/081* (2022.08); *B01D 2323/50* (2013.01); *B01D 2323/60* (2022.08); *C02F 2103/346* (2013.01); *C08F 2800/10* (2013.01); *C08J 2327/18* (2013.01)

(56) References Cited

FOREIGN PATENT DOCUMENTS

| | | |
|---|---|---|
| KR | 10-2009-0133100 A | 12/2009 |
| KR | 10-2018-0037137 A | 4/2018 |
| KR | 10-2019-0062168 A | 6/2019 |

OTHER PUBLICATIONS

Korean Office Action for related KR Application No. 10-2022-0065037 mailed Dec. 19, 2024 from Korean Intellectual Property Office.

Korean Notice of Allowance for related KR Application No. 10-2022-0065037 mailed Jan. 17, 2025 from Korean Intellectual Property Office.

\* cited by examiner

350 °C, 0.05~500 rad/s,

POROUS MEMBRANE INCLUDING PERFLUOROALKOXY ALKANE (PFA)-BASED MELT-EXTRUDED FILM AND HAVING PORES CONTROLLED BY BIAXIAL STRETCHING, AND MANUFACTURING METHOD THEREFOR

CROSS-REFERENCE TO PRIOR APPLICATION

This application claims priority to Korean Patent Application No. 10-2022-0065037 (filed on May 27, 2022), which is hereby incorporated by reference in its entirety.

BACKGROUND

The present disclosure relates to a porous membrane including a perfluoroalkoxy alkane (PFA)-based melt-extruded film and having pores controlled by biaxial stretching, and a manufacturing method therefore, and more particularly, to a fluoropolymer-based membrane for water treatment, which may be effectively used even for high temperature, strongly acidic wastewater, and a manufacturing method therefor.

In the electronics industry, the semiconductor industry has expanded rapidly since industrial development in the 1990s, and the amount of industrial water used has also increased every year. As of 2016, the semiconductor industry discharged the most wastewater among all industries. In the case of semiconductor wastewater, hydrofluoric acid wastewater with a pH of 2 to 3 generally accounts for 60% to 70% of the generated wastewater, and the fluorine concentration in wastewater is generally in the range of 200 to 300 mg/L, although it is somewhat different for each manufacturing process.

Fluorine is a halogen group element and its atomic number is 9. Since fluorine molecules are very unstable at room temperature, fluorine exists in nature in an ionic state or in the form of minerals such as fluorite ($CaF_2$) and cryolite ($Na_3AlF_6$). Fluoride ions are dissolved in water and present at a concentration of about 10 mg/L in groundwater and at a concentration of about 1 to 2 mg/L in seawater. When wastewater containing high concentrations of fluorine is to be discharged, it should satisfy the designated effluent quality standards.

If wastewater containing high concentrations of fluorine is discharged without being properly treated, it can have a great impact on the ecosystem including microorganisms and fish in the river, and fluorine in the wastewater may be incorporated in raw water and present in the form of a high concentration of dissolved fluorine even in drinking water, causing vomiting, abdominal pain, diarrhea, gastrointestinal upset, etc. There are cases in which fluorine flows into the air from phosphorus fertilizer plants and metal manufacturing plants. When a large amount of fluorine leaks it may be absorbed by plants, causing fluorine poisoning of livestock.

Due to large amounts of chemicals used during semiconductor manufacturing processes, there is a concern about the discharge of untreated components from wastewater treatment processes. To minimize this discharge, studies have been conducted on technology for making wastewater harmless, technology for reducing wastewater discharge, etc. Representative examples of technology for reducing wastewater discharge include in-process recycling of wastewater. In the semiconductor industry, the water quality items for each demand source for reuse are subdivided compared to those in other industries, and the water quality standards are also strict, and thus the development of appropriate treatment technology is required to recycle wastewater as process water. Currently, most of membranes that are used for water treatment are entirely dependent on imports from Japanese companies, etc., and in particular, semiconductor processes proceed at high temperatures and use strong acids such as HF. Accordingly, there is a need for a wastewater treatment technology that is effective even under strong acid and high temperature conditions.

PRIOR ART DOCUMENTS

Patent Documents (Patent Document 1) Korean Patent No. 10-0308525 (published on Nov. 5, 2001)

SUMMARY

An object of the present disclosure is to provide a fluoropolymer-based membrane for water treatment having excellent effects even under high temperature and strong acid conditions.

Another object of the present disclosure is to provide a method for more effectively manufacturing the membrane for water treatment and controlling the pores in the membrane.

To achieve the above objects, the present disclosure provides a membrane for water treatment including a fluoropolymer represented by the following Formula 1:

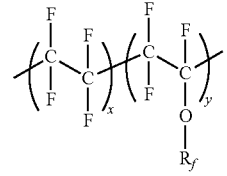

[Formula 1]

wherein the ratio of x:y may be 20 to 70:1, and Rf may be a perfluorinated group selected from among —$CF_3$, —$CF_2CF_3$, —$CF_2CF_2CF_3$, and —$CF(CF_3)_2$.

The fluoropolymer may be a copolymer of tetrafluoroethylene (TFE) and perfluoroalkyl vinyl ether (PAVE).

The membrane may be one manufactured by melt-extruding the fluoropolymer and then biaxially stretching the melt-extruded fluoropolymer under dry or wet conditions to control the average pore diameter of the membrane to 10 to 100 nm.

The membrane may be for semiconductor wastewater treatment.

The present disclosure provides a method for manufacturing a membrane for water treatment, the method including steps of: forming a film by melt-extruding a fluoropolymer represented by the following Formula 1; and controlling the pore size of the formed film by biaxial stretching:

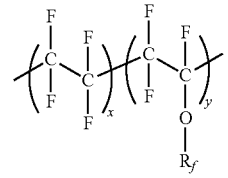

[Formula 1]

wherein the ratio of x:y may be 20 to 70:1, and Rf may be a perfluorinated group selected from among —CF$_3$, —CF$_2$CF$_3$, CF$_2$CF$_2$CF$_3$, and —CF(CF$_3$)$_2$.

The step of forming the film may be performed by melting the fluoropolymer in an extruder at a temperature of 340 to 360° C. and a screw rotation speed of 20 to 50 rpm, and then extruding the melted fluoropolymer in a film form through a slit die.

The extruded film may be passed through rolls at a speed of 200 to 1,200 mm/min to have an average thickness of 0.01 to 1 mm.

The step of controlling the pore size may be performed by biaxially stretching the formed film at a stretching speed of 0.1 to 1 mm/s and a stretching ratio of 110 to 140% at a temperature of 240 to 260° C.

The average diameter of the pores may be controlled to 10 to 100 nm.

The step of controlling the pore size may further include, after biaxially stretching the formed film, heat-treating the film at a temperature of 250 to 310° C. for 5 minutes or less.

The membrane for water treatment according to the present disclosure is based on a fluoropolymer and has physical properties that are resistant to high temperatures and strong acids, and thus it may be used for treatment of semiconductor wastewater containing strong acids such as HF.

According to the method for manufacturing a membrane for water treatment according to the present disclosure, it is possible to manufacture a film using a melt extrusion method under conditions (such as temperature) suitable for the characteristics and physical properties of the fluoropolymer, and to control the thickness of the film, and it is possible to control the pore size of the film to a pore size suitable for ultrafiltration by a biaxial stretching process.

Furthermore, by changing various process conditions and manufacturing a membrane for water treatment suitable for the purpose under the changed conditions, it is possible to advance domestic production of membranes that are entirely dependent on imports.

DETAILED DESCRIPTION

Figure 1:
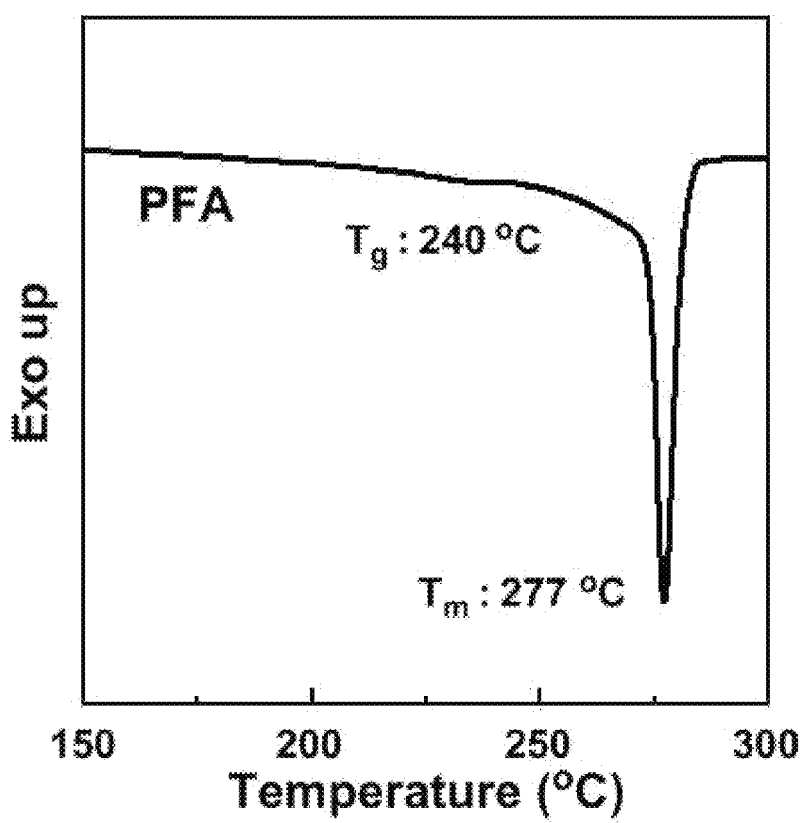
FIG. 1 is a differential scanning calorimetry (DSC) graph of the fluoropolymer perfluoroalkoxy alkane (PFA) according to one embodiment of the present disclosure.

Hereinafter, the present disclosure will be described in detail.

The terms used in the present disclosure are currently widely used general terms selected in consideration of their functions in the present disclosure, but they may change depending on the intents of those skilled in the art, precedents, or the advents of new technology. Accordingly, terms used in the present disclosure should be defined based on the meaning of the term and the entire contents of the present disclosure, rather than the simple term name.

Throughout the present specification, it is to be understood that when any part is referred to as "including" any component, it does not exclude other components, but may further include other components, unless otherwise specified.

The inventors of the present disclosure have manufactured a membrane, which has high resistance to high temperature and strong acid and has not been previously disclosed, using the fluoropolymer PFA, in order to treat high concentrations of fluorine contained in semiconductor wastewater, and have found that the thickness and pore size of the membrane is controlled depending on various process conditions, thereby completing the present disclosure.

The present disclosure provides a membrane for water treatment including a fluoropolymer.

More specifically, the membrane for water treatment may include a fluoropolymer represented by the following Formula 1:

[Formula 1]

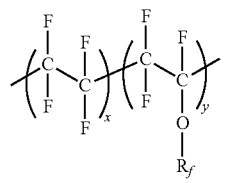

wherein the ratio of x:y may be 20 to 70:1, and Rf may be selected from among C1-C4 perfluorinated groups.

Preferably, the ratio of x:y may be 25 to 30:1, more preferably 27 to 29:1, without being limited thereto.

Preferably, Rf may be a perfluorinated group selected from among —$CF_3$, —$CF_2CF_3$, —$CF_2CF_2CF_3$, and —$CF(CF_3)_2$, and may be selected from among —$CF_2CF_3$, —$CF_2CF_2CF_3$, and —$CF(CF_3)_2$, without being limited thereto.

As used herein, the term "perfluoro or perfluorinated group" refers to all C—H in the molecular chain are substituted with C—F.

Preferably, the fluorine-based polymer may be perfluoroalkoxy alkane (PFA), which is a copolymer of tetrafluoroethylene (TFE) and perfluoroalkyl vinyl ether (PAVE), without being limited thereto.

The PFA is a thermoplastic fluororesin that maintains excellent properties of polytetrafluoroethylene (PTFE), has good melt fluidity, and may be melt-molded by injection molding or extrusion molding.

Accordingly, the membrane may be one manufactured by melt-extruding the fluoropolymer and then biaxially stretching the melt-extruded fluoropolymer under dry or wet conditions to control the average pore diameter of the membrane to 10 to 100 nm, preferably 10 to 50 nm, without being limited thereto.

The membrane may be for semiconductor wastewater treatment because it may be used even under high temperature and strong acid conditions, without being limited thereto.

The present disclosure provides a method for manufacturing a membrane for water treatment using a fluoropolymer.

More specifically, the method for manufacturing a membrane for water treatment may include steps of: forming a film by melt-extruding a fluoropolymer represented by the following Formula 1; and controlling the pore size of the formed film by biaxial stretching:

[Formula 1]

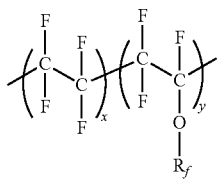

wherein the ratio of x:y may be 20 to 70:1, and Rf may be selected from among C1-C4 perfluorinated groups.

Preferably, the ratio of x:y may be 25 to 30:1, more preferably 27 to 29:1, without being limited thereto.

Preferably, Rf may be a perfluorinated group selected from among —$CF_3$, —$CF_2CF_3$, —$CF_2CF_2CF_3$, and —$CF(CF_3)_2$, and may be selected from among —$CF_2CF_3$, —$CF_2CF_2CF_3$, and —$CF(CF_3)_2$, without being limited thereto.

In the method for manufacturing a membrane for water treatment according to the present disclosure, the step of forming the film may be performed by melting the fluoropolymer in an extruder, and then extruding the melted fluoropolymer in a film form through a slit die.

The degree of melting of the fluoropolymer may be controlled by the temperature of the extruder and the rotational speed of the screw. Preferably, the fluoropolymer may be melted in the extruder at a temperature of 340 to 360° C. and a screw rotation speed of 20 to 50 rpm. If the temperature and the screw rotation speed are lower than the lower limits of the above ranges, the fluoropolymer cannot be sufficiently melted or the molten polymer can cool down quickly and cannot be sufficiently extruded. For this reason, melting of the fluoropolymer is preferably performed in the above-described temperature and rotation speed ranges.

The thickness of the extruded film may be controlled by controlling the speed of the rolls of the extruder. Specifically, the extruded film may be passed through the rolls at a speed of 200 to 1,200 mm/min to have an average thickness of 0.01 to 1 mm, and preferably, may be passed through the rolls at a speed of 400 to 1,000 mm/min to have an average thickness of 0.05 to 0.2 mm, and more preferably, may be passed through the rolls at a speed of 800 mm/min to have an average thickness of 0.08 to 0.1 mm, without being limited thereto.

In the method for manufacturing a membrane for water treatment according to the present disclosure, the step of controlling the pore size may be performed by stretching the film formed in the step of forming the film.

Preferably, the pore size of the formed film may be controlled by biaxially stretching the formed film at a stretching speed of 0.1 mm/s and a stretching ratio of 110 to 140%, more preferably 112 내지 137%, at a temperature of 240 to 260° C., more preferably 250° C., without being limited thereto.

The biaxial stretching may be performed in the transverse direction and the machine direction sequentially or simultaneously, and this stretching process may be performed two or more times consecutively.

The biaxial stretching may be performed under dry or wet conditions. In particular, when the biaxial stretching is performed under dry conditions, there are advantages in that it is easy to the process temperature, stretching ratio, stretching speed, etc., and it is possible to perform the stretching process without a solvent, which makes washing and drying processes unnecessary.

Accordingly, the average diameter of the pores may be controlled to 10 to 100 nm, preferably 10 to 50 nm, which is suitable for ultrafiltration (UF), without being limited thereto.

In addition, the step of controlling the pore size may further include, after biaxially stretching the formed film, heat-treating the film at a temperature between the glass transition temperature ($T_g$) and melting temperature ($T_m$) of the polymer, preferably 250 to 310° C., for 5 minutes or less.

In the method for manufacturing a membrane for water treatment according to the present disclosure, the step of forming the film and the step of controlling the pore size of the formed film by biaxial stretching may be performed sequentially, continuously, or simultaneously.

For example, the biaxial stretching process may be performed simultaneously with extruding the molten fluoropolymer, without being limited thereto.

Hereinafter, the present disclosure will be described in detail with reference to examples to facilitate understanding of the present disclosure. However, the following examples are merely for illustrating the present disclosure, and the scope of the present disclosure is not limited to the following examples. Rather, these examples are provided so that this disclosure will be thorough and complete, and will fully convey the scope of the present disclosure to those skilled in the art.

<Example 1> Production of Fluoropolymer Film

1. Selection of Fluoropolymer Material

In order to produce a polymer film for semiconductor wastewater treatment, first, perfluoroalkoxy alkane (PFA) represented by the following Formula 1 was purchased from DAIKIN (trade name: AP-201).

[Formula 1]

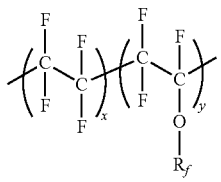

wherein the ratio of x:y may be about 28:1, and Rf may be selected from among those represented by the following Formula 2.

[Formula 2]

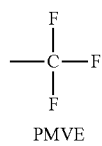

PMVE

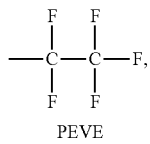

PEVE

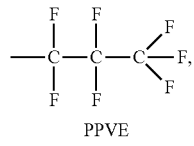

PPVE

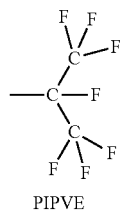

PIPVE

The PFA is a type of fluorine-based polymer, specifically, a copolymer of tetrafluoroethylene (TFE) and perfluoroalkyl vinyl ether (PAVE). It has good melt fluidity while maintaining the excellent properties of polytetrafluoroethylene (PTFE), which has been previously used as a fluoropolymer.

Table 1 below shows the physical properties of PFA in comparison with those of PTFE.

[Table 1]

| Physical properties | PTFE | PFA |
|---|---|---|
| Structure | | |
| Melting point ($T_m$) | 327° C. | 305 to 310° C. |
| Glass transition temperature ($T_g$) | 119° C. | 250° C. |
| Melt flow rate | 0.2 to 1 g/10 min | 30 g/10 min |

Figure 2:
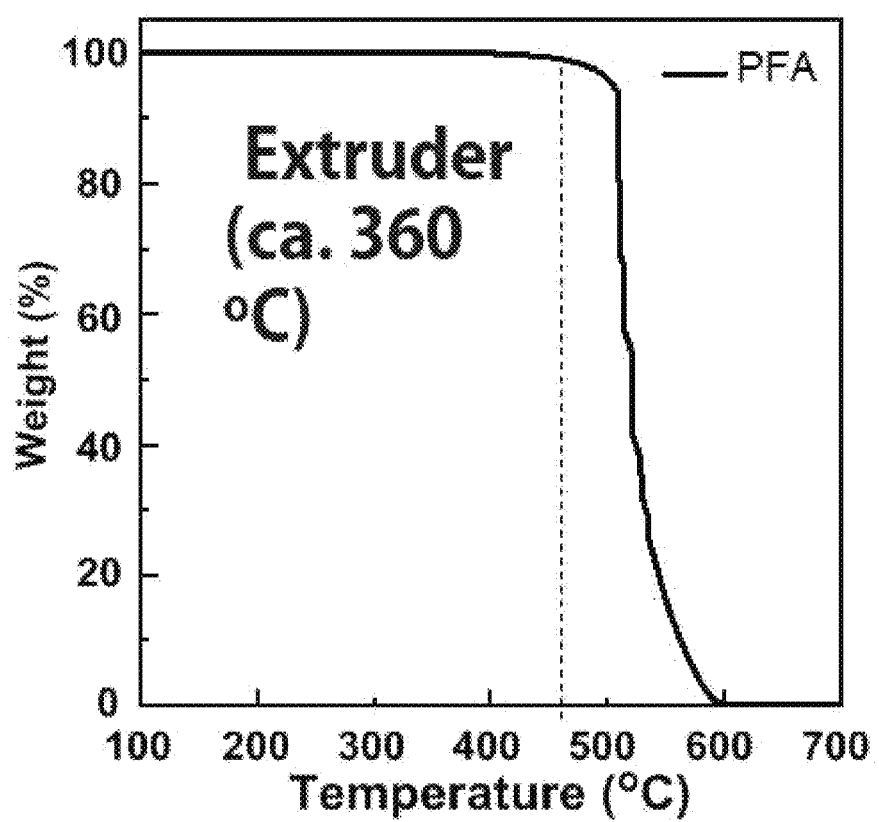
FIG. 2 is a thermogravimetric analysis (TGA) graph of the PFA.
Figure 3:
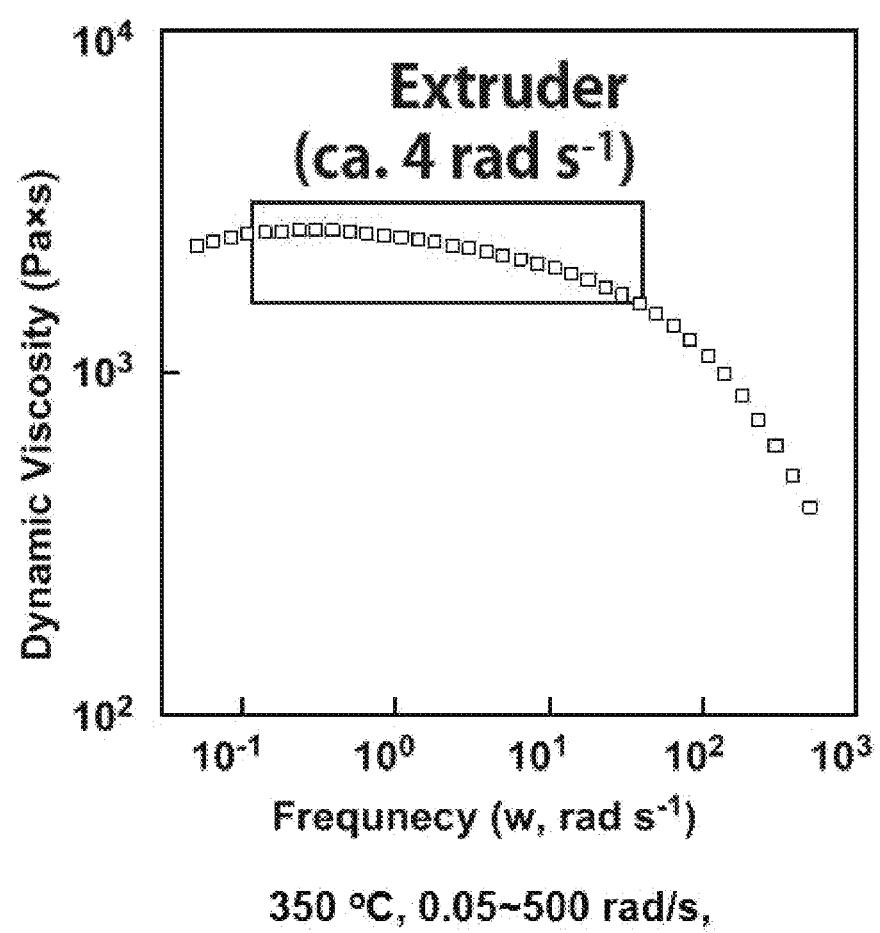
FIG. 3 shows the results of analyzing the dynamic viscosity (Dynamic Viscosity) of the PFA.

Referring to Table 1 above, it can be seen that PFA has a lower melting point and a higher melt flow index (MFI) than conventional PTFE, indicating that it has excellent flowability (FIGS. 1 to 3).

Table 2 below shows the physical properties of PFA and perfluoromethyl alkoxy (MFA). Here, MFA is a copolymer of tetrafluoroethylene and perfluoromethyl vinyl ether (FIG. 4).

TABLE 2

| Physical properties | PFA (Daikin AP-201) | MFA (Solvay MFA 1041) |
|---|---|---|
| Type | Pellet | Pellet |
| Use temperature (° C.) | 260 | 220 |
| MFR (g/10 min) (372° C., 5 kg) | 30 | 22 to 28 |
| Specific gravity | 2.14 | 2.13 to 2.18 |
| Melting point (° C.) | 306 | 294 |
| Tensile strength (MPa, 23° C.) | 30 | 20 |
| Elongation (%, 23° C.) | 450 | 500 |

Figure 4:
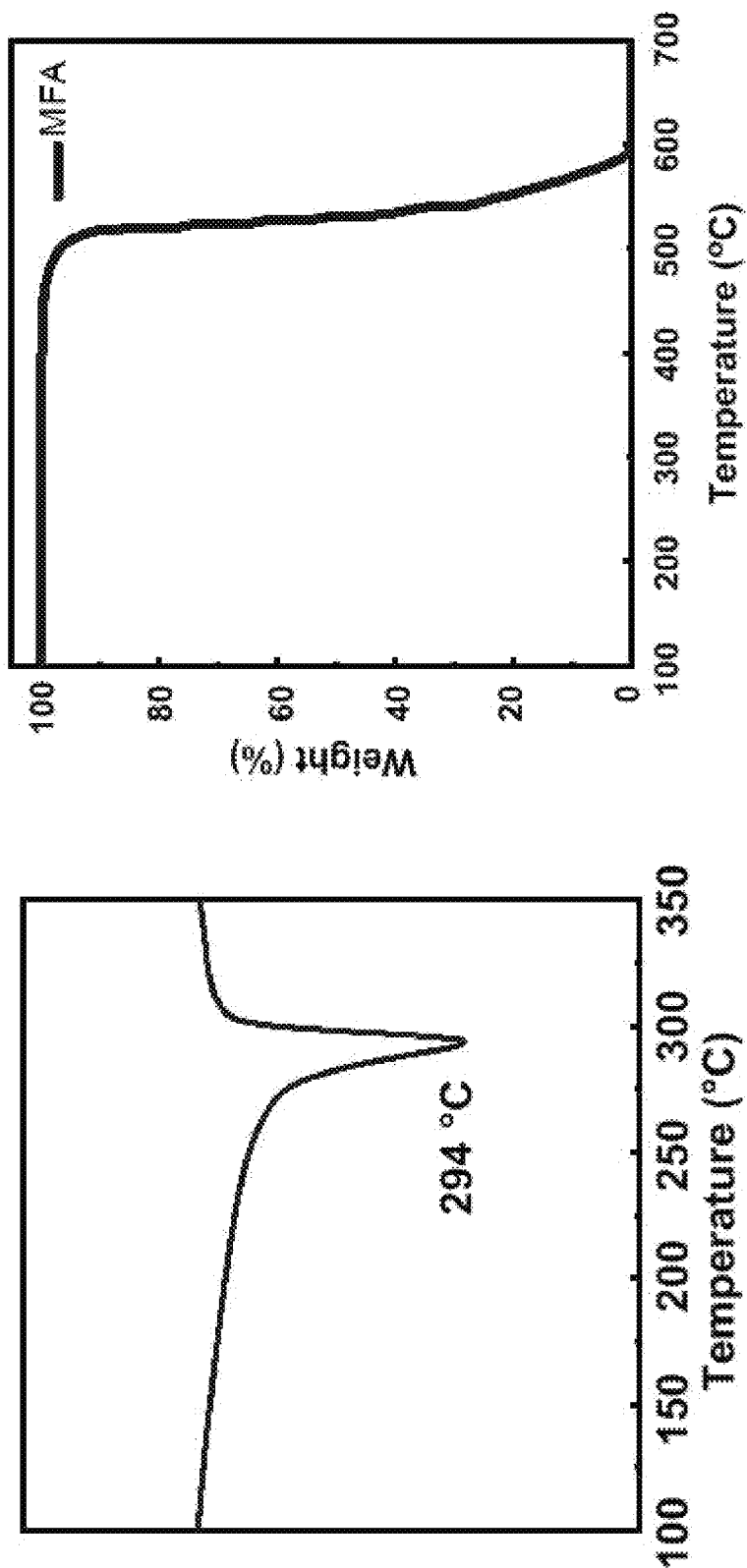
FIG. 4 shows DSC (left) and TGA (right) analysis graphs of another fluoropolymer, perfluoromethyl alkoxy (MFA).
Figure 5:
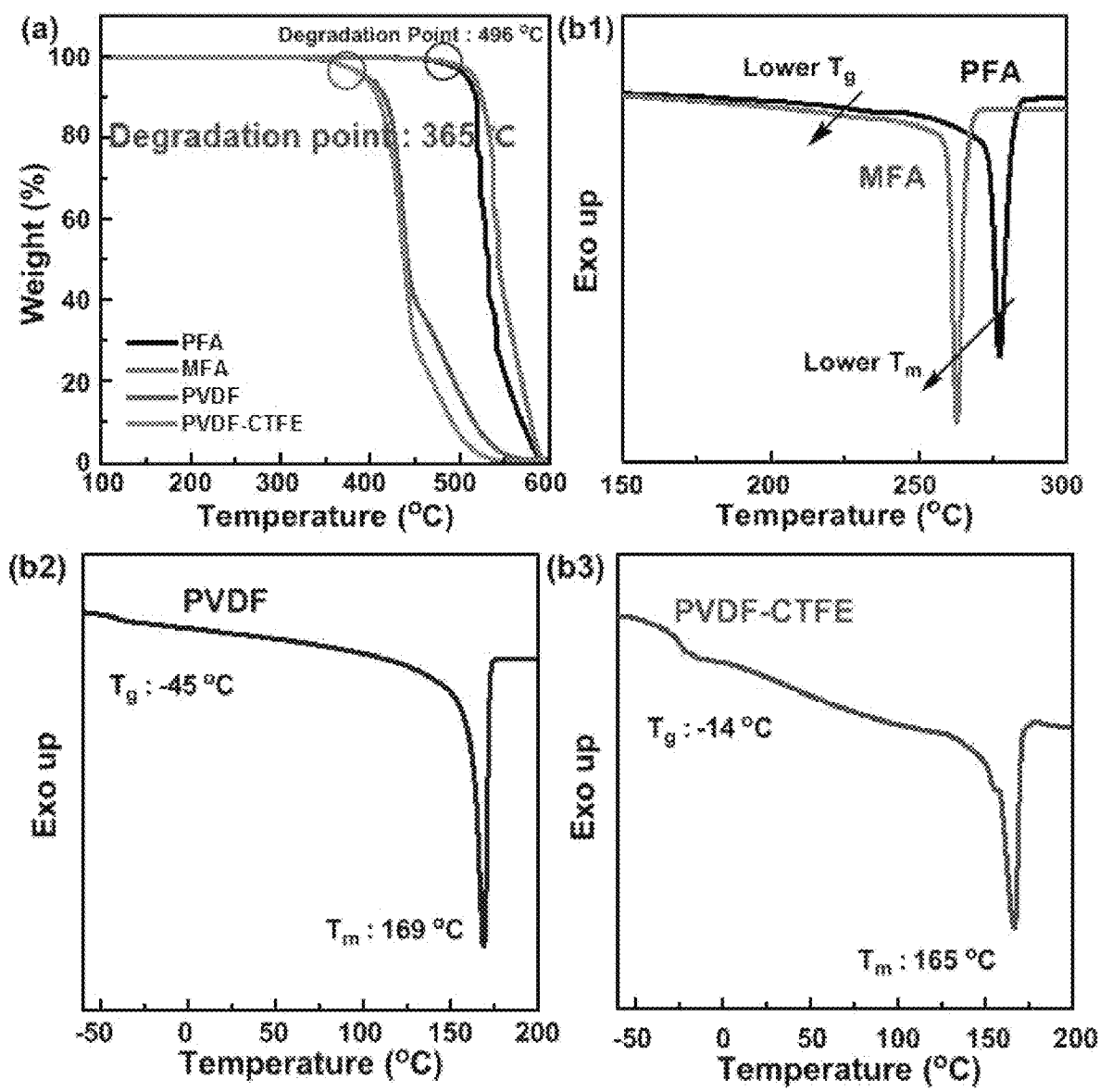
FIG. 5 shows graphs comparing the properties of polyvinylidene fluoride (PVDF) and a polyvinylidene fluoride-chlorotrifluoroethylene copolymer (PVDF-CTFE) in addition to the PFA and MFA. Specifically, FIG. 5(*a*) is a TGA graph comparing the properties of the PFA and MFA, FIG. 5(*b*1) is DSC graph comparing the properties of the PFA and MFA, and FIG. 5(*b*2) and are DSC graphs of PVDF and PVDF-CTFE, respectively.

Referring to Table 2 above and FIGS. 4 and 5, it can be seen that the PFA and MFA have similar physical and thermal properties. Thus, MFA was also expected to be excellent in terms of stability.

Meanwhile, polyvinylidene fluoride (PVDF, Solef®) and a polyvinylidene fluoride-chlorotrifluoroethylene (CTFE) copolymer (PVDF-CTFE, Solef®) were also examined, but they were expected to be less stable in high-temperature wastewater containing high concentrations of acids, such as semiconductor wastewater.

2. Selection of Extrusion Method

A melt extrusion method is a method of extruding a material having a relatively low melting point and good flowability, and a paste extrusion method is a method of extruding a material having a high melting point and poor flowability using pressure and temperature (mainly pressure).

In the case of melt extrusion, a continuous process is possible, extrusion can be performed for a long time when the supply of material is sufficient, and it is possible to control the physical properties of the extruded material (film) through various variables. In addition, there are advantages in that the process can be performed under relatively mild conditions compared to conventional paste extrusion and can also be performed on a small scale.

Accordingly, referring to FIGS. 1 to 5 and Table 1 or 2 above, it was determined that it would be easy to form a film using PFA or MFA having a low melting point and good flowability, and the melt extrusion method would be more suitable for forming the film than the paste extrusion method.

3. Film Production Using Hot-Melt Extrusion Method

Figure 6:
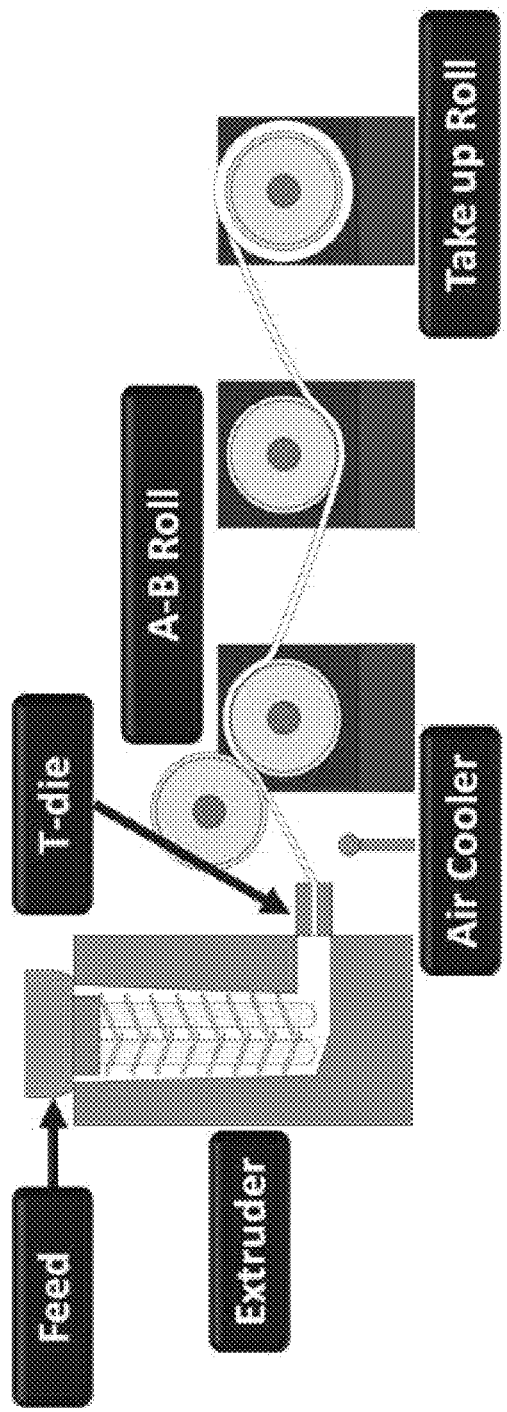
FIG. 6 schematically shows a hot-melt extrusion process for manufacturing a film according to one embodiment of the present disclosure.
Figure 7:
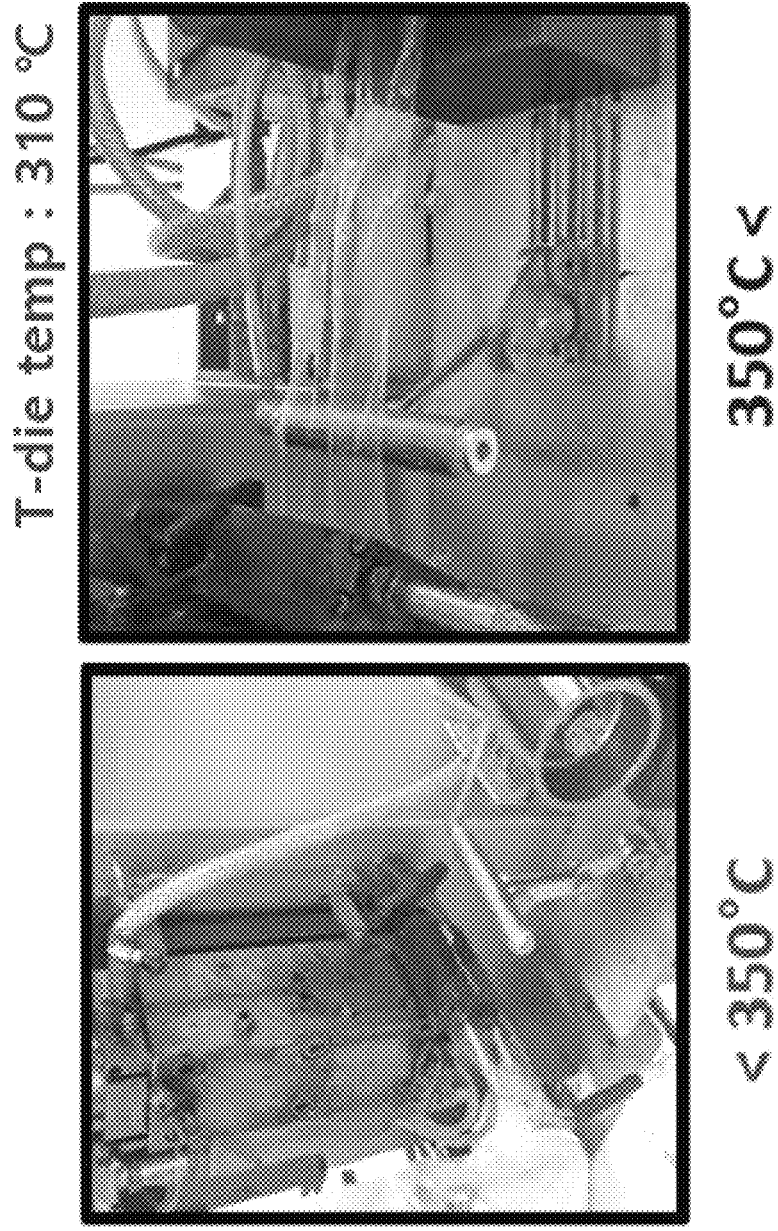
FIG. 7 shows the hot-melt extrusion process at different extruder temperatures.
Figure 8:
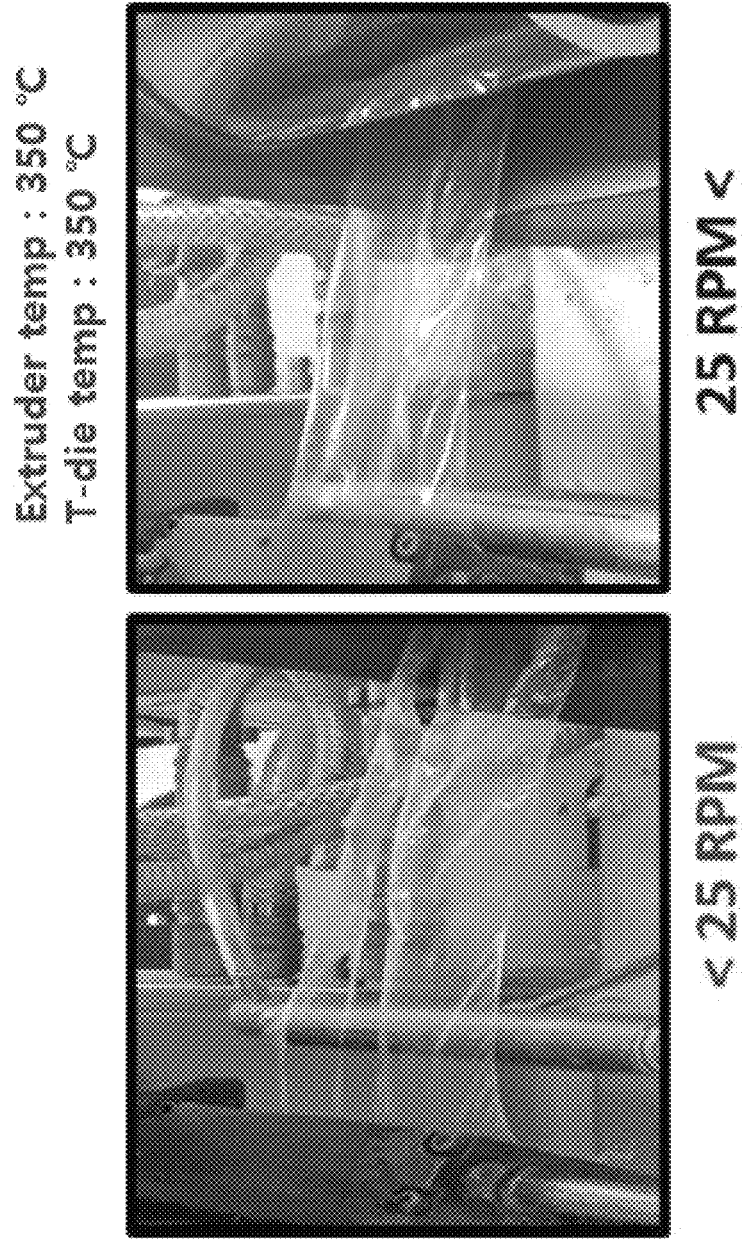
FIG. 8 shows the hot-melt extrusion process at different screw rotation speeds.

Referring to FIG. 6, PFA polymer pellets were periodically supplied to a feed side, and the polymer pellets and the polymer pellets were melted in an extruder at a temperature of about 350° C. and a screw rotation speed of 25 rpm or more to make extrusion thereof possible. Although the polymer pellets can be extruded at a temperature equal to or higher than the melting point of the polymer pellets, but the polymer pellets should be melted at around 350° C. (FIG. 7) in order to extrude a sufficient extrusion of the polymer pellets. If the rotation speed (rpm) of the screw is excessively low, the polymer pellets are not sufficiently melted (FIG. 8). For this reason, the melting process is preferably performed under the above-described conditions.

Figure 9:
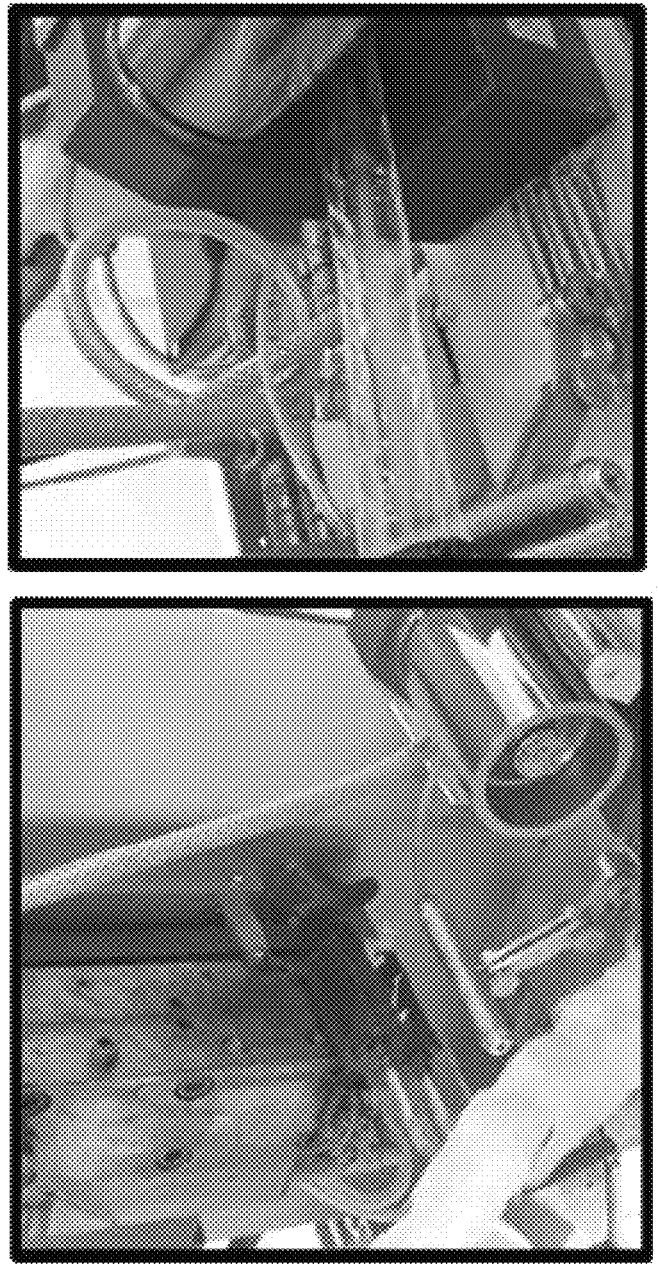
FIG. 9 shows the hot-melt extrusion process at different T-die temperatures.

Thereafter, the melt was extruded in a desired film form through a T-die slit. If the temperature of the T-die is excessively low, the polymer melt cools down quickly and cannot be extruded. For this reason, the melt extrusion was performed at an appropriate temperature, that is, the same temperature (350° C.) as the extruder temperature (FIG. 9).

In addition, during the hot-melt extrusion, the thickness of the film can be controlled by controlling the screw rotation speed and the roll speed.

Table 3 below shows the film thickness controlled depending on the screw speed and roll speed when the temperatures of the extruder and the T-die are 350° C.

TABLE 3

| Screw speed (RPM) | Roll speed (mm/min) | Film thickness (mm) |
|---|---|---|
| 40 | 1,200 | 0.035 to 0.045 |
|  | 800 | 0.08 to 0.1 |
|  | 400 | 0.15 to 0.2 |
|  | 200 | 0.2 to 0.4 |

Figure 10:
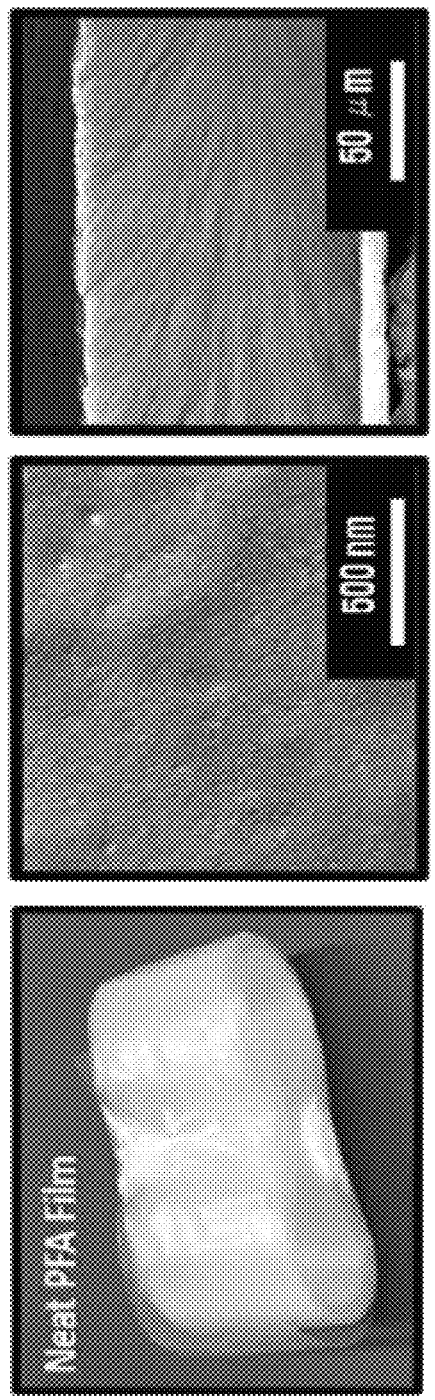
FIG. 10 shows a PFA film manufactured according to one Example of the present disclosure.

Under these conditions, a PFA film having a thickness of 0.1 mm as shown in FIG. 10 was finally produced.

<Example 2> Control of Pores of Film by Stretching Process

Figure 11:
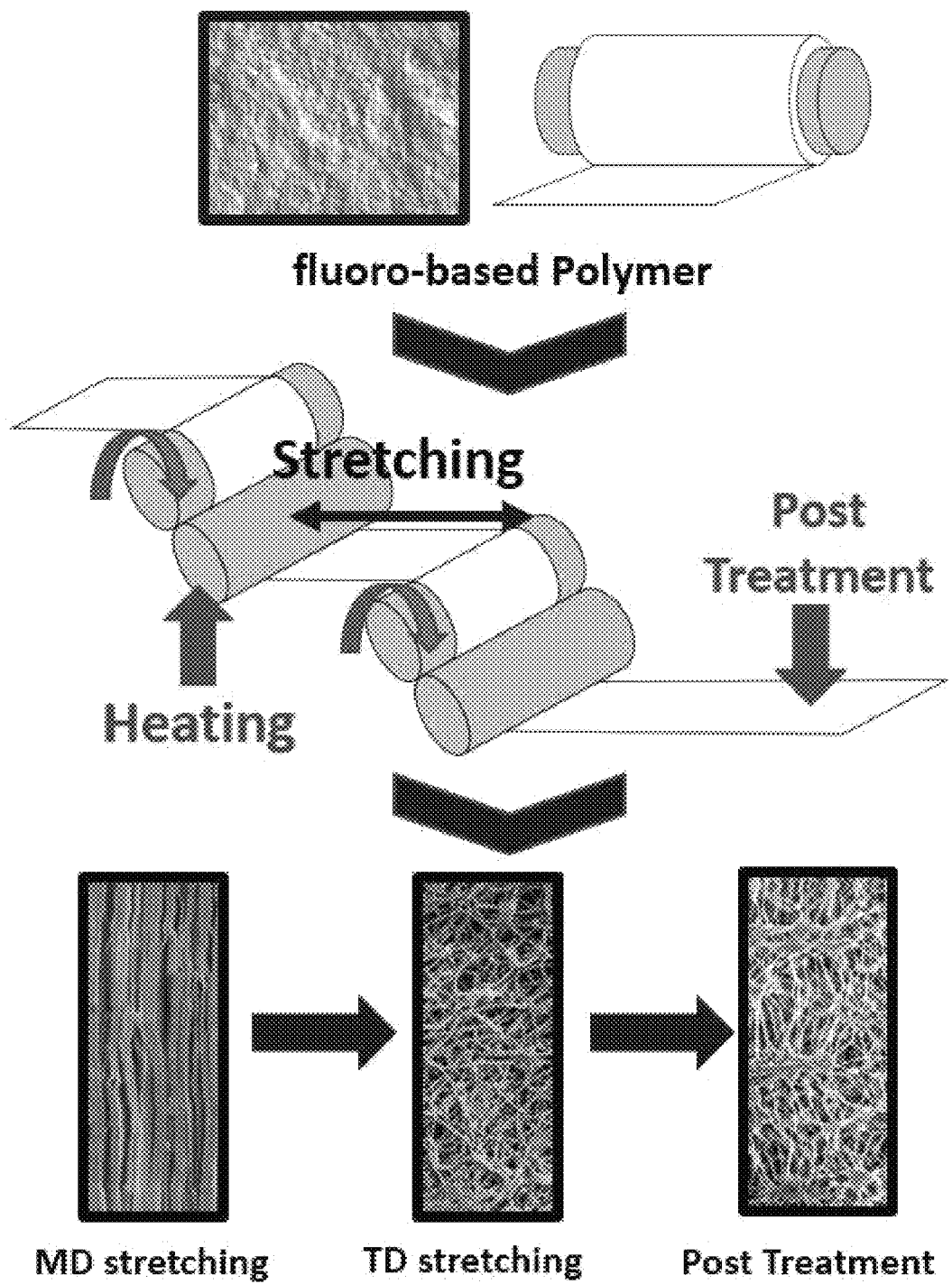
FIG. 11 schematically illustrates a stretching process for controlling the pore size of a film according to another embodiment of the present disclosure.

The pores of the film produced according to Example 1 were controlled using a dry biaxial stretching process in which it is easy to control temperature, stretching ratio, stretching speed, etc. are easy to control, and which may be performed without a solvent, making washing and drying processes unnecessary (FIG. 11).

Figure 12:
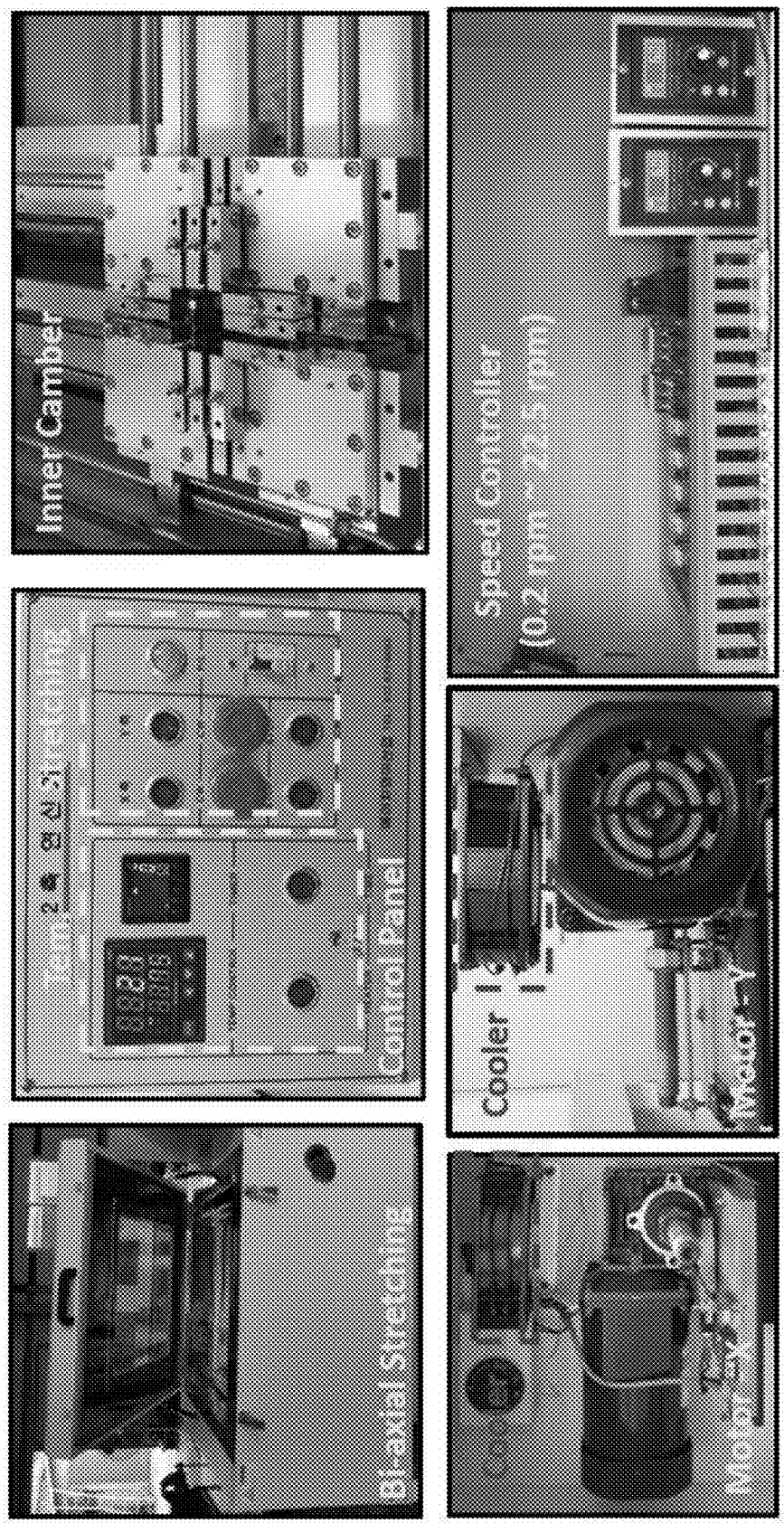
FIG. 12 shows equipment used in the stretching process shown in FIG. 11.

In this Example, the pores were controlled using the biaxial stretching equipment shown in FIG. 12.

Figure 13:
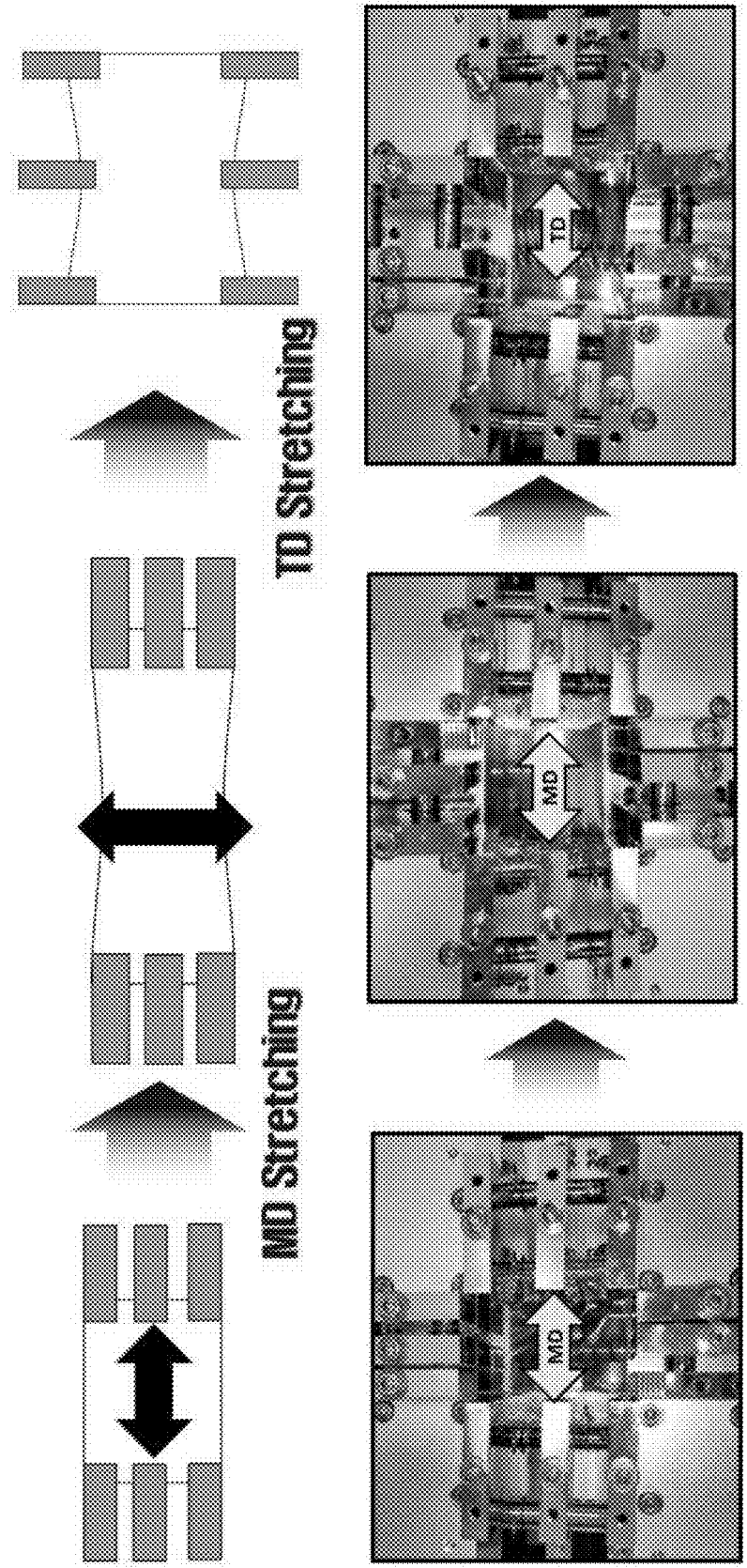
FIG. 13 shows a process of biaxial stretching in the machine direction (MD direction) and the transverse direction (TD direction).
Figure 14:
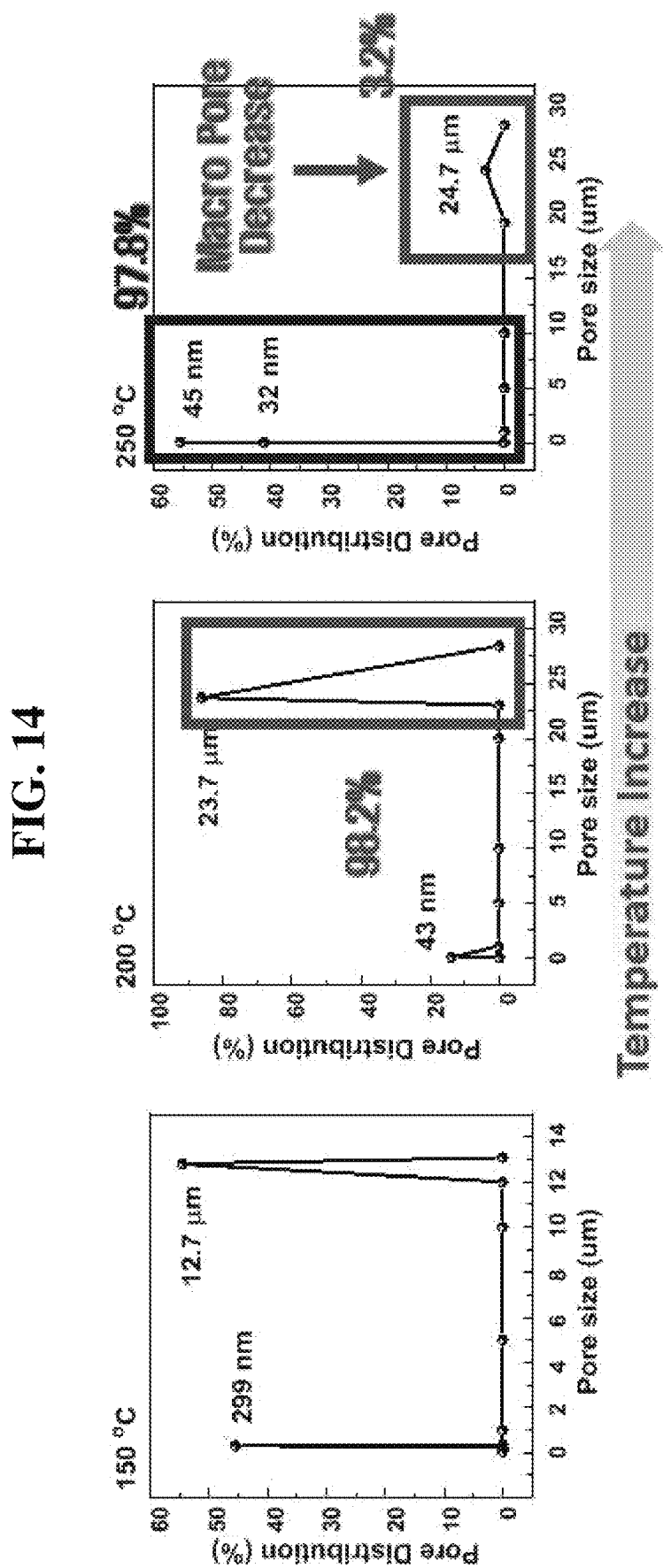
FIG. 14 shows the results of examining changes in pore size depending on temperature during the biaxial stretching process.

First, the PFA film produced in Example 1 was cut into a size of about 4 cm in length and about 4 cm in width. The cut PFA film was stretched at a stretching ratio of 125% (4×125%) in the machine direction (MD direction) and at a stretching ratio of 125% (4×125%) in the transverse direction (TD direction), at various temperatures (50, 100, 150, 200, and 250° C.) (FIG. 13). As the temperature is the most important factor determining the fluidity of the polymer chain, stretching at each temperature was performed first, and then the pore size was controlled by adjusting the stretching speed and the stretching ratio. In the test conducted at each temperature, the pore size and the pore distribution were measured by a porometer (a porosity meter; a device for measuring the size of pores and measuring the distribution of pores), and the temperature at the point where the pore size was small and the pore distribution was uniform was checked. As a result, as shown in FIG. 14, it was confirmed that, as the temperature increased, the proportion of macropores having a size of 10 to 30 μm decreased, and the proportion of micropores having a size of 100 nm or less increased. When stretching was performed at a temperature equal to higher than the glass transition temperature of PFA (250° C.), the film could be stretched well without breaking. Based on these results, the stretching temperature of the PFA film was set to 250° C.

Figure 15:
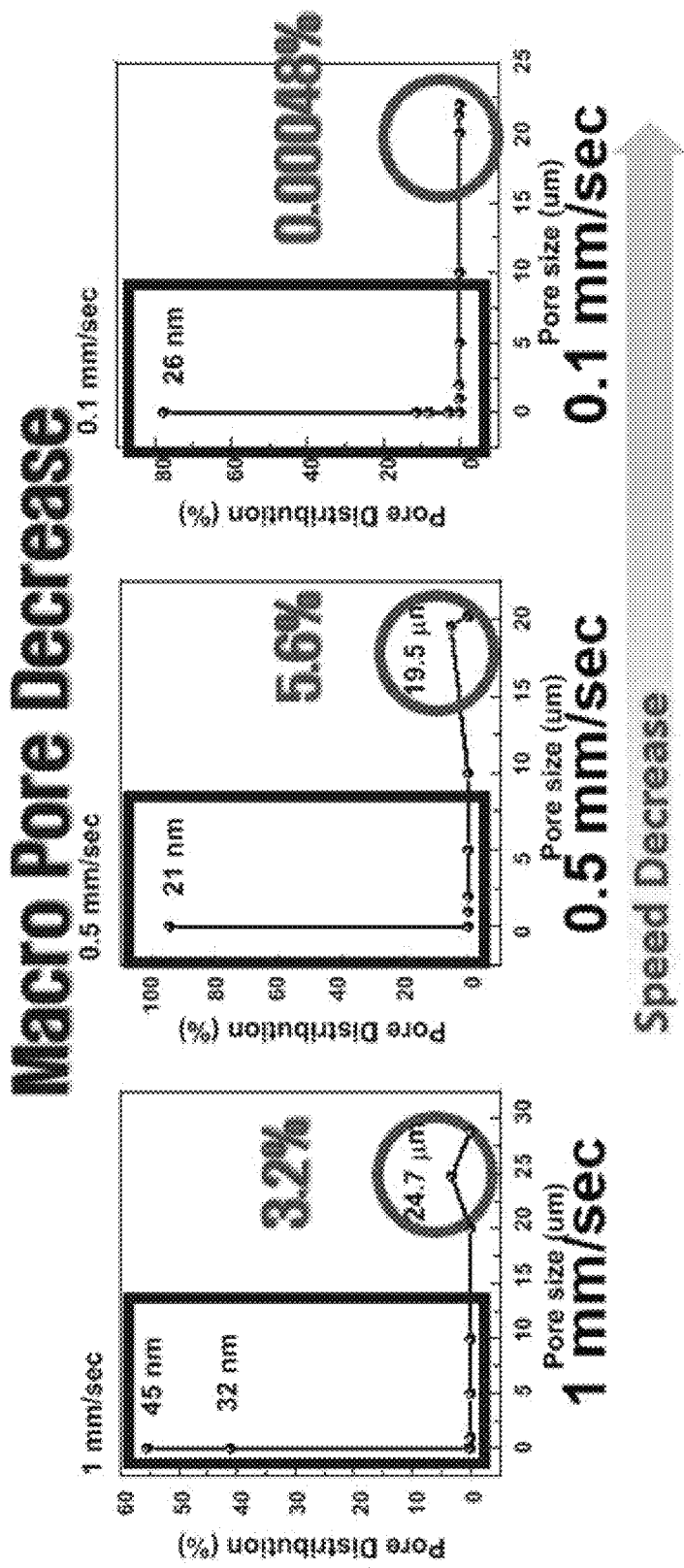
FIG. 15 shows the results of examining changes in pore size depending on stretching speed during the biaxial stretching process.

Films were produced while controlling the stretching speed (0.6 to 6 rpm) at the set temperature, and then the optimal stretching speed was determined by measuring the pore size and the pore distribution using the porometer. As a result, as shown in FIG. 15, it was confirmed that, as the stretching speed decreased from 1 mm/sec to 0.5 mm/sec and 0.1 mm/sec, the size and distribution of pores also decreased, and the proportion of macropores also decreased. Accordingly, the stretching speed was set to 0.1 mm/sec.

Figure 16:
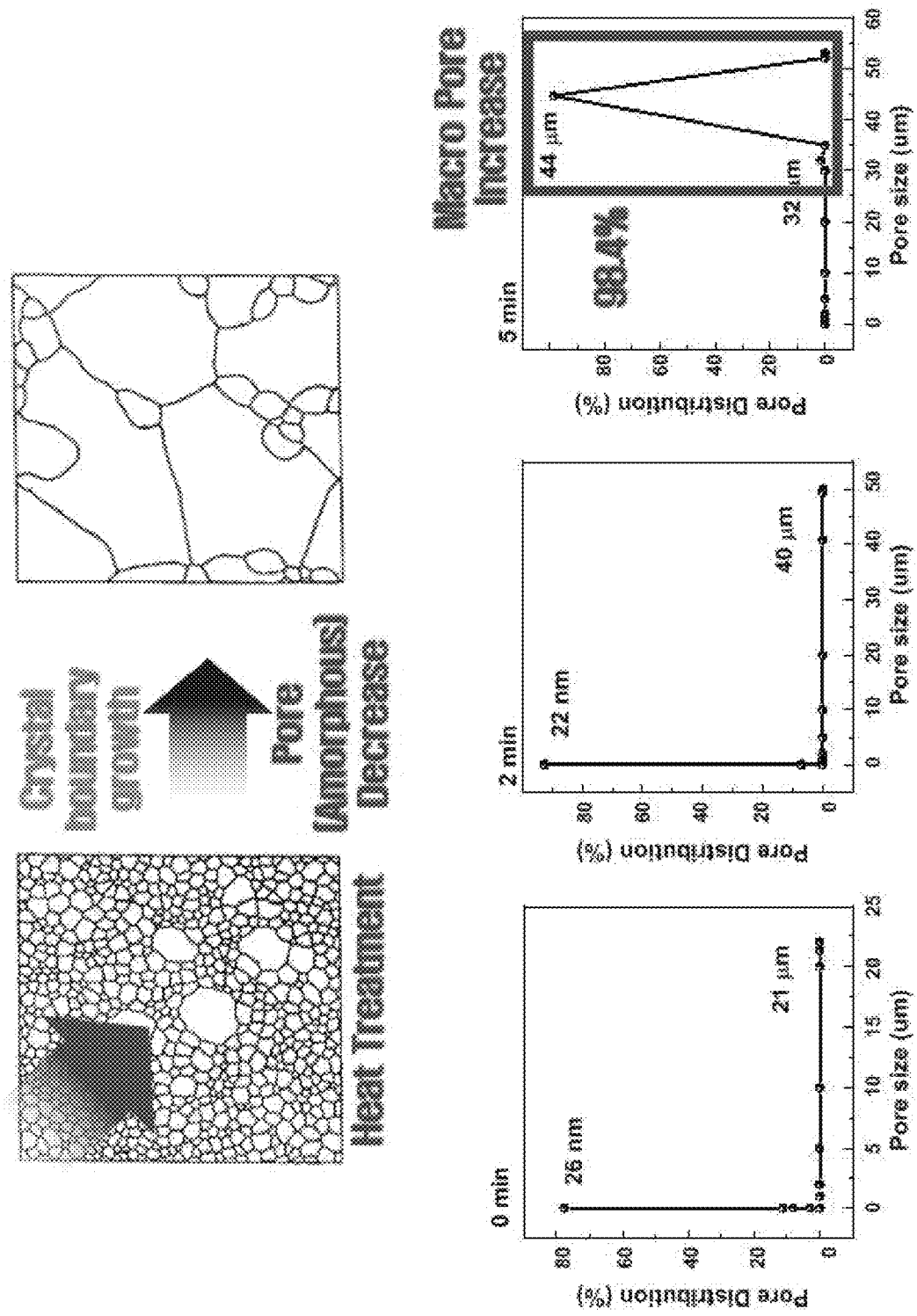
FIG. 16 shows the results of examining changes in pore size depending on post-heat treatment during the biaxial stretching process.
Figure 17:
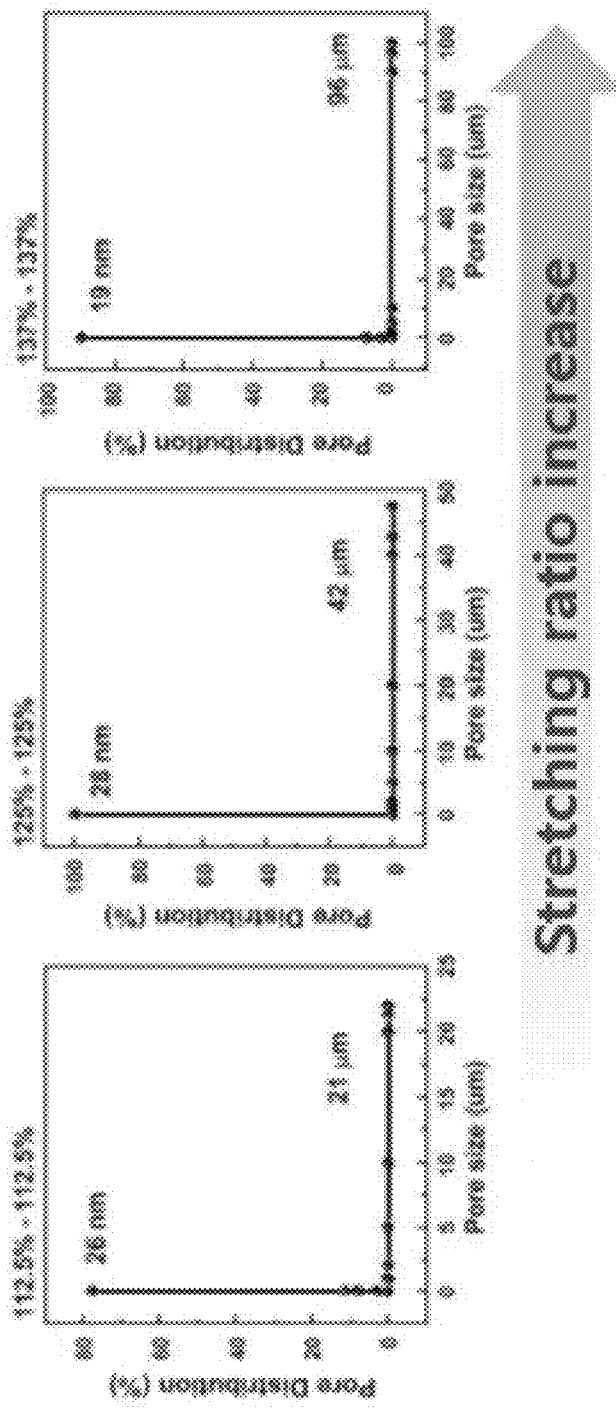
FIG. 17 shows the results of examining changes in pore size depending on stretching ratio during the biaxial stretching process.

Films were produced while controlling the post-heat treatment time at the set temperature and stretching speed, and then the optimal post-heat treatment time was determined by measuring the pore size and the pore distribution using the porometer. As a result, as shown in FIG. 16, it was confirmed that, when the heat treatment time exceeded 5 minutes, crystalline fibrils grew and the proportion of mesopores decreased. Therefore, it is preferable that the heat treatment be performed for 5 minutes or less at a temperature equal to or higher than the glass transition temperature (Tg) and equal to or lower than the melting temperature (Tm) of the polymer. Optimal conditions were set by controlling the stretching ratio at the set temperature, stretching speed, and post-heat treatment time. As a result, as shown in FIG. 17, no significant change was observed in the stretching ratio range of 112.5 to 137%. It is considered that, if the stretching ratio exceeds 137%, the film may be torn, and thus a high stretching ratio of 137% or less is required to control the pore size.

Although the present disclosure has been described in detail with reference to the specific features, it will be apparent to those skilled in the art that this description is only of a preferred embodiment thereof, and does not limit the scope of the present invention. Thus, the substantial scope of the present invention will be defined by the appended claims and equivalents thereto. Furthermore, the scope of the present invention is defined by the appended claims, and it should be understood that all modifications or variations derived from the meanings and scope of the claims and equivalents thereto are included within the scope of the present disclosure.

What is claimed is:

1. A method for manufacturing a membrane for water treatment, the method comprising steps of:
   forming a film by melt-extruding a fluoropolymer represented by the following Formula 1; and
   controlling a pore size of the formed film by biaxial stretching:

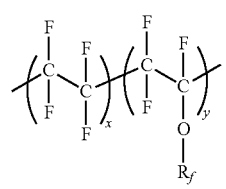

[Formula 1]

wherein a ratio of x:y is 20 to 70:1, and Rf is a perfluorinated group selected from among —$CF_3$, —$CF_2CF_3$, —$CF_2CF_2CF_3$, and —$CF(CF_3)_2$, wherein the step of controlling the pore size is performed by biaxially stretching the formed film at a stretching speed of 0.1 to 1 mm/s and a stretching ratio of 110 to 140% at a temperature of 240 to 260° C.

2. The method of claim 1, wherein the extruded film is passed through rolls at a speed of 200 to 1,200 mm/min to have an average thickness of 0.01 to 1 mm.

3. The method of claim 1, wherein the pores are controlled to have an average diameter of 10 to 100 nm.

4. The method of claim 1, wherein the step of controlling the pore size further comprises, after biaxially stretching the formed film, heat-treating the film at a temperature of 250 to 310° C. for 5 minutes or less.

\* \* \* \* \*